United States Patent [19]
Liden et al.

[11] 3,816,297

[45] June 11, 1974

[54] HYDROCRACKING PROCESS

[76] Inventors: Thomas M. Liden, c/o Texaco Inc., P.O. Box 509, Beacon, N.Y. 125208; John E. May, Jr., c/o Texaco Inc., P.O. Box 1608, Nederland, Tex. 77627

[22] Filed: June 25, 1968

[21] Appl. No.: 739,646

[52] U.S. Cl. ............................................. 208/111
[51] Int. Cl. .......................................... C10g 13/02
[58] Field of Search .................................... 208/111

[56] References Cited
UNITED STATES PATENTS

| | | | |
|---|---|---|---|
| 3,140,253 | 7/1964 | Plank et al. | 208/120 |
| 3,254,017 | 5/1966 | Arey et al. | 208/59 |
| 3,269,934 | 8/1966 | Hansford | 208/111 |
| 3,346,482 | 10/1967 | Arey et al. | 208/111 |
| 3,394,074 | 7/1968 | Buchmann et al. | 208/111 |
| 3,554,899 | 1/1971 | Hansford | 208/111 |
| 3,617,483 | 11/1971 | Child et al. | 208/59 |
| 3,617,509 | 11/1971 | Hensley, Jr. | 208/111 |
| 3,726,790 | 4/1973 | Gallagher et al. | 208/111 |

*Primary Examiner*—Delbert E. Gantz
*Assistant Examiner*—James W. Hellwege
*Attorney, Agent, or Firm*—T. H. Whaley; C. G. Reis

[57] ABSTRACT

A hydrocracking process for the conversion of heavy hydrocarbon oils using a catalyst containing a hydrogenating component and a cracking component which latter is composed of a modified crystalline zeolite and at least one amorphous inorganic oxide. The process is particularly adapted to hydrocrack charge stocks which are traditionally difficult to hydrocrack such as those having a high nitrogen content, a high polycyclic aromatic content or a Conradson Carbon Residue of at least 1 percent.

4 Claims, No Drawings

HYDROCRACKING PROCESS

This invention relates to a hydrocarbon conversion process. More particularly, it is concerned with the conversion of heavy hydrocarbon distillates and residua into lighter more valuable products by hydrocracking.

Hydrocracking is now well known in petroleum refining and has attained considerable commercial success. However, the process as currently practiced has several limitations and to date it has not been considered practical by those skilled in the art to charge heavy distillates and residual fractions to conventional hydrocracking processes.

Hydrocracking catalysts generally are bifunctional and contain two components, a hydrogenating component supported on a cracking component. It is well known that cracking catalysts should be acidic as this quality enhances the cracking activity and accordingly it has been accepted that the supports for hydrocracking catalysts should also be acidic to promote the cracking portion of the hydrocracking reaction. One of the disadvantages of petroleum hydrocracking processes as currently practiced is that the conventional catalysts are rapidly deactivated when petroleum fractions such as heavy distillates and residua are brought into contact with the hydrocracking catalyst. Apparently one of the reasons for the rapid deactivation of the hydrocracking catalyst is that these particular charge stocks have a high organic nitrogen content.

During the course of the hydrocracking reaction the organic nitrogen may, because of its basic nature, attack the acidic sites of the cracking component thereby neutralizing the acidity of the catalyst and causing a rapid deactivation in the cracking activity of the catalyst. It is also quite likely that the organic nitrogen compounds are decomposed under hydrocracking conditions with the formation of ammonia which, too, will attack the acidic sites of the cracking component thereby causing additional loss of catalyst activity. Unfortunately as acid sites of the cracking component are neutralized it becomes necessary to increase the reaction temperature to obtain the required conversion. However, as the temperature is increased the product distribution becomes unsatisfactory and it is necessary to shut down the process and to regenerate or even in some instances replace the catalyst. For the foregoing reasons then it is conventional in hydrocracking processes to precede the hydrocracking unit with a hydrotreating unit wherein the organic nitrogen can be converted to ammonia which is separated from the feed stream to the hydrocracking unit. More recently, catalysts have been developed which are more resistant to ammonia than were the earlier catalysts and with some of these later-developed catalysts it is not necessary to carry out a separation for ammonia removal between the hydrotreating and the hydrocracking zones provided the original charge does not contain too high a concentration of nitrogen. Even so, these more recent catalysts are still not totally satisfactory for hydrocracking purposes in that although they are more resistant to attack by ammonia they are still subject to deactivation by organic nitrogen compounds and therefore the charge stock must still be subjected to a preliminary hydrotreating operation to convert organic nitrogen present in the charge stock to ammonia.

Another disadvantage is that in the conventional hydrocracking processes which for the most part are practiced to convert hydrocarbon distillates to lighter materials such as naphtha and kerosene for motor and jet fuels respectively, the charge stocks, i.e., those boiling in the gas oil range are usually also high in polynuclear aromatics. These compounds, particularly the tricyclics, have a tendency to cause deposition of carbon on the catalyst thereby preventing the charge stock from coming into contact with the catalyst resulting in reduced conversion. Even when the charge is subjected to a preliminary hydrotreating, in many instances if the charge contains high concentrations of polycyclic aromatics this treatment is not sufficient to reduce the polycyclic content of the charge to the extent necessary to prevent contamination and deactivation of the catalyst by the deposition of carbon thereon.

For these reasons hydrocracking as practiced commercially today has certain disadvantages in that the hydrocracking step must be preceded by a hydrotreating step in which the major reaction is a hydrodenitrogenation. Even when such a preliminary step is performed the charge stocks have been confined to heavy naphthas and gas oils having an end point not greater than about 850°F.

It is an object of the present invention to provide a novel process for the hydrocracking of heavy hydrocarbon fractions. Another object of the invention is to provide a process for the hydrocracking of charge stocks having high concentrations of nitrogen and/or polycyclic aromatic hydrocarbons over prolonged on-stream periods. A still further object of the invention is to provide a hydrocracking process which does not require pretreating of the charge in a hydrotreating zone. A still further object of the invention is to provide a process for the hydrocracking asphalt-containing residual stocks such as stocks having a Conradson carbon residue of at least 1 percent. These and other objects will be obvious to those skilled in the art from the following disclosure.

In accordance with the process of our invention, the hydrocracking of heavy hydrocarbon distillates and residual fractions into lighter materials is effected by passing the charge stock into contact with a hydrocracking catalyst in the presence of hydrogen at a temperature between about 600° and 875°F., preferably 700°–850°F., a space velocity (volume of charge per volume of catalyst per hour) between 0.1 and 10.0, preferably 0.25 to 1.0, a pressure between 500 and 20,000 psig or higher, preferably between 1,500 and 3,000 psig and a hydrogen rate of between 1,000 and 30,000 SCFB, preferably 3,000–15,000 SCFB.

The hydrogen used in the process of our invention need not necessarily be pure. The hydrogen content of the hydrogenating gas should be at least about 60 percent and preferably is at least about 75 percent by volume. Particularly suitable sources of hydrogen are catalytic reformer by-product hydrogen and hydrogen produced by the partial combustion of hydrocarbonaceous material followed by shift conversion and $CO_2$ removal.

The catalyst used in the process of our invention contains two components, a hydrogenating component supported on a cracking component. Suitable hydrogenating components comprise metals and compounds of metals of Group VIII, e.g., the noble metals particularly platinum and palladium, and the iron group metals, particularly cobalt and nickel. Advantageously the catalyst may also contain a Group VI metal, e.g., molybdenum or tungsten used in conjunction with the iron group metal. The hydrogenating component may be used either in the metallic form or in the form of a compound, e.g., the oxide, sulfide or telluride.

The cracking component of the catalyst comprises a modified crystalline zeolite and at least one amorphous inorganic oxide the modified zeolite being present in an amount between about 10 and 60 percent by weight. Suitable amorphous inorganic oxides are those displaying cracking activity such as silica, alumina, magnesia, zirconia and beryllia which may have been treated with an acidic agent such as hydrofluoric acid to impart cracking activity thereto. A preferred mixture of amorphous inorganic oxides comprises silica-alumina in a proportion ranging from 60–90 percent silica and 10–40 percent alumina.

The modified zeolite portion of the cracking component has uniform pore openings of from 6–15 Angstrom units, has a silica-alumina ratio of at least 2.5, e.g., 3–10, and has a reduced alkali metal content. The modified zeolite is prepared by subjecting synthetic zeolite Y to ion exchange by contact several times with fresh solutions of an ammonium compound at temperatures ranging between about 100° and 250°F. until the ion exchange appears substantially complete. The ion exchanged zeolite is then washed to remove solubilized alkali metal and dried at a temperature sufficiently high to drive off ammonia. The zeolite Y is then in the hydrogen form and has an alkali metal content of about 2–4 weight percent. The ion exchanged zeolite is calcined at a temperature of about 1,000°F. for several hours and after cooling the ion exchange, washing and drying are repeated. This treatment results in a further reduction in the alkali metal content of the zeolite to less than 1 percent usually to about 0.5 percent. Calcination at 1,000–1,500°F., may take place here or may be postponed until after the incorporation of the amorphous inorganic oxide and impregnation with the hydrogenating component at which time the composite should be calcined. Whether calcination is postponed or repeated, the final calcination should not exceed 1,200°F.

Hydrocracking catalysts containing a hydrogenation component supported on a cracking component composed of at least one amorphous inorganic oxide and the twice ion exchanged, twice calcined zeolite have superior hydrocracking activity and additionally are more resistant to deactivation when brought into contact with nitrogen compounds and polycyclic aromatics. They also show good stability to stream. The hydrocracking catalyst should also be substantially free from rare earth metals and should have a rare earth content below 0.5 weight percent, preferably below 0.2 wt. percent. It has been found that although rare earth metals are reputed to enhance the activity and stability characteristics of cracking catalysts, their presence in a hydrocracking catalyst has been found to be undesirable.

When the hydrogenating component of the hydrocracking catalyst is a noble metal it should be present in an amount between about 0.2 and 5.0 percent by weight based on the total catalyst composite. Preferably the noble metal is present in an amount between 0.5 and 2 percent. When the hydrogenating component comprises a Group VIII metal it should be present in an amount between about 1 and 40 percent by weight based on the total catalyst composite. If the iron group metal is the sole hydrogenating component, it may be present in an amount between about 5 and 10 percent. When a Group VI metal is used in conjunction with a Group VIII metal, the Group VI metal may be present in an amount preferably between about 5 and 30 percent. Particularly suitable catalysts are those containing between 0.5 and 1.0 weight percent noble metal and those containing between 5 and 10 percent iron group metal and between 15 and 30 percent Group VI metal. Specific examples of suitable catalysts are those containing 0.75 weight percent palladium or containing about 6 percent nickel and 20 percent tungsten on a support made up of about 20 percent modified zeolite Y, 58 percent silica and 22 percent alumina.

The hydrogenating component is deposited on the cracking component by impregnating the latter with a solution of a compound of the hydrogenating component. Such techniques are well known in the art and require no description here.

When used in the sulfide form the catalyst may be converted thereto by methods well known in the art such as by subjecting the catalyst at a temperature between about 400° and 700°F. to contact with a sulfiding agent, for example, hydrogen containing 10–20 percent hydrogen sulfide or carbon disulfide.

The charge stocks used as feed to the process of the present invention are those which traditionally are extremely difficult to hydrocrack. Such stocks include coker distillates, whole crudes, atmospheric residua, vacuum residua, tar sand oil, shale oil and heavy cycle gas oils. The characteristics of these charges are that they contain a portion which boils at least above 850°F. and have a nitrogen content of at least 500 ppm. Usually these materials also have a polycyclic aromatic content of at least 10 percent by volume.

The following examples are presented for illustrative purposes only.

EXAMPLE I

In this example the charge stock is an Arabian Atmospheric Residuum having the following characteristics:

TABLE 1

| | | |
|---|---|---|
| Gravity °API | 14.2 | |
| Conradson Carbon Residue, wt. % | 10.54 | |
| Sulfur, wt. % | 3.0 | |
| Nitrogen, wt. % | 0.19 | |
| Distillation Range | vol. % | wt. % |
| IBP–650°F. | 1.71 | 1.56 |
| 650–850°F. | 18.3 | 16.9 |
| 850°F.+ | 80.0 | 81.2 |

The catalyst contains 0.75 percent palladium deposited from a solution of palladium chloride in dilute ammonium hydroxide on a support composed of 21 percent modified zeolite prepared as described above, 58 percent silica and 21 percent alumina.

Reaction conditions and other data are tabulated below:

TABLE 2

| | |
|---|---|
| Temperature, °F. | 750 |
| Pressure, psig | 1500 |
| Space Velocity, (v/v/hr) | 0.5 |
| Hydrogen rate, SCFB | 10,000 |

| 6 hour periods | A | B | C | D | E | F | C-F |
|---|---|---|---|---|---|---|---|
| Gravity, °API | 28.6 | 28.8 | 25.7 | 19.7 | 18.5 | 18.5 | 21.9 |
| CCR, wt. %. | | | | | | | 9.19 |
| Sulfur, wt. % | | | | | | | 2.42 |
| Nitrogen, wt. % | | | | | | | 0.14 |
| Distillation Range, vol. % | | | | | | | |
| IBP-400°F. | | | | | | | 17.1 |
| 400-650°F. | | | | | | | 8.6 |
| 650-850°F. | | | | | | | 11.0 |
| 850°F.+ | | | | | | | 62.6 |

Only the product from periods C–F is included in the composite, periods A and B being used to permit the catalyst to "settle down."

EXAMPLE II

This example is a repeat of Example I, the only difference being that the catalyst contains 2 percent by weight palladium.

Data on the product are as follows.

TABLE 3

| 6 hour periods | A | B | C | D | E | F | B-F |
|---|---|---|---|---|---|---|---|
| Gravity, °API | 42.8 | 21.7 | 18.0 | 17.1 | 16.8 | 16.6 | 18.6 |
| CCR, wt. % | | | | | | | 8.57 |
| Sulfur, wt. % | | | | | | | 2.42 |
| Nitrogen, wt. % | | | | | | | 0.15 |
| Distillation Range, vol. % | | | | | | | |
| BIP-400°F. | | | | | | | 6.4 |
| 400-650°F. | | | | | | | 6.6 |
| 650-850°F. | | | | | | | 19.6 |
| 850°F.+ | | | | | | | 66.7 |

Since the products of periods B–F are more representative of that obtained from a "stabilized" catalyst, only the product from period A is excluded from the composite. The interesting feature of this example is that not only does a considerable amount of conversion take place but that the catalyst containing 2 percent palladium does not appear to be more active than that of Example 1 containing 0.75 percent palladium.

EXAMPLE III

In this example the charge stock has a boiling range of 405°–650°F., an API Gravity of 32.7°, a sulfur content of 0.68 wt. percent and a nitrogen content of 1,700 ppm. The cracking component contains 9 wt. percent modified zeolite, 66 wt. percent silica and 25 wt. percent alumina. The hydrogenating component is 5.4 percent nickel and 15.3 percent tungsten based by weight on the total catalyst composite. The catalyst is sulfided prior to use.

Reaction conditions of 1,500 psig, 1.0 liquid hourly space velocity and 7,500 SCF hydrogen per barrel of charge are maintained, the temperature being regulated to obtain a 30 percent conversion to 400°F. end point gasoline (42° API). Results are as follows.

TABLE 4

| Hours on Stream | Temperature | API Gravity |
|---|---|---|
| 30 | 725°F. | 41.7 |
| 60 | 730°F. | 43.1 |
| 108 | 735°F. | 44.0 |

From these data it can be seen that substantial conversion is obtained although the charge contains 1,700 ppm nitrogen and that even after 100 hours of operation the catalyst shows little if any loss in activity.

EXAMPLE IV

In this example the charge stock is a mixture composed of 47 percent delayed coker gas oil and 53 percent cycle gas oil containing 1,350 ppm nitrogen, 0.73 wt. percent sulfur, a total aromatic content of 41 vol. percent and a polycyclic aromatic content of 29 vol. percent. The catalyst is similar to that of Example III except that the support contains 22 wt. percent modified zeolite.

Reaction conditions of 1,500 psig, a liquid hourly space velocity of 0.5 and a hydrogen rate of 15,000 SCFB are maintained the temperature being regulated to obtain a 40 percent conversion to 400°F. end point gasoline (42° API). Results are as follows.

TABLE 5

| Hours on Stream | Temperature | API Gravity |
|---|---|---|
| 100 | 720°F. | 44.2 |
| 200 | 723°F. | 49.0 |
| 300 | 725°F. | 39.2 |
| 424 | 749°F. | 42.6 |

These data show the prolonged activity of the catalyst in spite of the high nitrogen content and high polycyclic aromatic content of the charge.

EXAMPLE V

The charge in this example is a California Reduced Crude in which 66 vol. percent boils above 800°F., which contains 1,409 ppm basic nitrogen, 7,488 ppm total nitrogen, 1.41 wt. percent sulfur, 9.54 percent Conradson Carbon Residue and which has an API Gravity of 16.4°.

The catalyst contains 6.2 wt. percent nickel and 18.3 wt. percent tungsten on the same support as the catalyst of Example I. It is sulfided prior to use.

Average reaction conditions during the on stream period are as follows:

TABLE 6

| | |
|---|---|
| Temperature | 815°F. |
| Pressure | 2200 psig |
| Space Velocity | 0.75 v/v/hr. |
| Hydrogen rate | 8000 SCFB |

After 980 hours of operation, the total liquid product contains 1,809 ppm basic nitrogen, 4,884 ppm total nitrogen, 0.73 wt. percent sulfur, 4.35 Conradson Carbon Residue and has an API Gravity of 24.5. Its boiling range appears below.

TABLE 7

| | |
|---|---|
| 115-400°F. | 12.0 vol. % |
| 400-650°F. | 29.3 vol. % |
| 650-800°F. | 15.3 vol. % |
| 800°F.+ | 43.4 vol. % |

The above results show the outstanding activity and life of the catalyst while treating a charge stock containing 1,409 ppm basic nitrogen and having a Conradson Carbon Residue of 9.54 wt. percent.

EXAMPLE VI

The charge in this example is a gas oil having a boiling range of 440°–875°F., a sulfur content of 0.32 wt. percent, a nitrogen content of 700 ppm and an API Gravity of 22.4°. The catalyst contains 0.61 wt. percent palladium on a cracking component composed of 56 percent modified zeolite, 12 percent alumina and 32 percent silica.

Reaction conditions of 1,500 psig, 1.0 space velocity and 7,500 SCF hydrogen per barrel of feed are maintained, the temperature being regulated to obtain a 30 percent conversion to 400°F. E.P. gasoline (42° API).

Results are as follows.

TABLE 8

| Hours on Stream | Temperature | API Gravity |
| --- | --- | --- |
| 30 | 740°F. | 41.1 |
| 60 | 750°F. | 40.9 |
| 108 | 760°F. | 41.7 |

In each of the foregoing examples, the rare earth metal content of the catalyst is less than 0.2 weight percent and the alkali metal content is less than 0.5 weight percent. The catalyst is also in the form of a fixed bed of 5/32-inch pellets. Unless otherwise specified, the nitrogen content of the various fractions is expressed as basic nitrogen.

It will apparent to those skilled in the art that the catalyst may be used in smaller or larger sizes and different shapes and may also be used in the form of a moving or fluidized bed. Various other modifications of the invention as hereinbefore set forth may be made without departing from the spirit and scope thereof, and therefore, only such limitations should be imposed as are indicated in the appended claims.

We claim:

1. A process for the hydrocracking of a heavy hydrocarbon oil containing at least 500 ppm organic nitrogen and having a Conradson Carbon Residue of at least 1 percent selected from the group consisting of atmospheric residua and vacuum residua which comprises contacting said hydrocarbon oil under hydrocracking conditions with a catalyst comprising a hydrogenating component consisting essentially of a noble metal in an amount between 0.5 and 1.0 percent by weight based on the total catalyst composite supported on a cracking component consisting essentially of from 10–60 wt. percent of a modified crystalline zeolite having an alkali metal content of less than 0.5 wt. percent and a rare earth metal content of less than 0.2 wt. percent prepared by subjecting synthetic zeolite Y to a plurality of alternating sequences of ion exchange with an ammonium compound and calcination with the balance of said cracking component being composed of a mixture of from about 60–90 wt. percent silica and 40–10 wt. percent alumina.

2. The process of claim 1 in which the hydrogenating component of the catalyst is palladium.

3. The process of claim 1 in which the heavy hydrocarbon oil is an atmospheric residuum.

4. The process of claim 1 in which the heavy hydrocarbon oil is a vacuum residuum.

* * * * *